(12) United States Patent
Hirata et al.

(10) Patent No.: US 7,499,111 B2
(45) Date of Patent: Mar. 3, 2009

(54) PROJECTION TYPE DISPLAY DEVICE AND BACK PROJECTION TYPE DISPLAY DEVICE USING THE SAME

(75) Inventors: Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 10/842,936

(22) Filed: May 10, 2004

(65) Prior Publication Data

US 2005/0012870 A1 Jan. 20, 2005

(30) Foreign Application Priority Data

Jul. 18, 2003 (JP) .............................. 2003-198848

(51) Int. Cl.
*H04N 5/64* (2006.01)
*H04N 9/31* (2006.01)

(52) U.S. Cl. ........................ 348/744; 348/750; 348/756; 348/782; 348/805

(58) Field of Classification Search ................ 348/744, 348/750, 756, 757, 776–786, 802–805; 353/84, 353/31
See application file for complete search history.

(56) References Cited

U.S. PATENT DOCUMENTS

| | | | |
|---|---|---|---|
| 5,648,870 A * | 7/1997 | Mistutake | 359/487 |
| 5,653,520 A * | 8/1997 | Kato | 353/34 |
| 5,696,564 A | 12/1997 | Hatakeyama | |
| 5,788,357 A * | 8/1998 | Muth et al. | 362/494 |
| 6,568,815 B2 * | 5/2003 | Yano | 353/84 |
| 6,646,690 B1 | 11/2003 | Takezawa | |
| 2006/0176450 A1 | 8/2006 | Akiyama | |

FOREIGN PATENT DOCUMENTS

| | | |
|---|---|---|
| CN | 2553576 | 5/2003 |
| JP | 08-314012 A | 11/1996 |
| JP | 11-101991 A | 4/1999 |
| JP | 2000-347292 A | 12/2000 |
| JP | 2001-066599 A | 3/2001 |
| JP | 2001-092419 | 4/2001 |
| JP | 2002-131750 | 5/2002 |
| JP | 2002-131750 A | 5/2002 |
| JP | 2002-131750 * | 9/2002 |
| JP | 2003-048749 A | 2/2003 |
| JP | 2003-114480 A | 4/2003 |
| JP | 2003-140266 A | 5/2003 |

* cited by examiner

*Primary Examiner*—Trang U Tran
(74) *Attorney, Agent, or Firm*—Townsend and Townsend and Crew LLP (57) ABSTRACT

The system provides a projection-type video display device with high image quality and high reliability. The system improves color purity by cutting the yellow component from red and green, enhances the optical energy balance of the three colors by providing a reflection-type attenuation filter for reflecting light in the green optical path. The system also improves contrast characteristics by providing an optical phase difference compensator in the green optical path and increases durability of a video display element by arranging two optical parts having ultraviolet reflection coating in the blue optical path. Also an ultraviolet absorption filter for the incidence side of a blue liquid crystal panel is described.

12 Claims, 7 Drawing Sheets

PROJECTION TYPE DISPLAY DEVICE AND BACK PROJECTION TYPE DISPLAY DEVICE USING THE SAME

BACKGROUND OF THE INVENTION

This invention relates to a projection-type video display device for projecting images. A conventional projection-type video display device is equipped with a video display element such as a liquid crystal panel whose picture elements are arranged in a matrix, and a light source which irradiates the video element. The video display element modulates the light strength of every picture element light source according to the image signal. The image thus generated is magnified by a unit such as a projection lens to be projected on a screen.

Projection-type video display devices are often used by business users, for example, for presentations, by projecting images from a personal computer onto a screen. Accordingly, priority has been given to optical brightness and high-power light sources or highly efficient illumination optical systems have been developed to project images clearly, even in a well-lighted room.

Alternatively, rear-projection-type video devices are currently being marketed. These are equipped with an optical unit inside a cabinet, for projecting images onto the back of a screen placed in a predetermined position. The rear-projection-type display device is generally used for a home theater, to enjoy television or video images. This tends to create a demand for high-quality image, durable products. Projection-type video devices are designed to give priority consideration, not only to optical brightness for excellent color purity, color reproducibility, contrast, etc. but also to having a display screen with a long life. An example of a projection-type video device with high quality color purity is disclosed in JP-A-2001-92419, and a projection-type video device with high contrast is disclosed in JP-A-2002-131750.

The projection-type video display of the 92419 patent document above is designed to have improved color purity for every color by blocking yellow components of wavelengths of 570-590 nm from coming into the red light flux R or the green light flux G. However, achieving color balance when synthesizing a red image light beam Ri, a green image light beam Gi, and a blue image light beam Bi, which are finally modulated by the video display element, is not taken into consideration. In particular, a chromaticity problem of a white-displayed image is produced by synthesizing the red image light beam Ri, the green image light beam Gi and the blue image light beam Bi because the y-value is high at a position of vertical separation from a locus of a black body on the chromaticity coordinates, causing a greenish white hue.

Moreover, color preference tends to have changed lately, the bluish white of color temperature of 9800° K being increasingly favored just like a cathode-ray-tube-type television. In this system, however, a technique for heightening the color temperature of white is not disclosed, nor is the necessity for heightening the color temperature of the white display suggested.

On the other hand, the projection-type video device described in the 131750 patent document is designed to improve contrast by arranging an optical phase difference compensator between the respective R, G and B image display elements and an incidence-side polarizing plate. Color reproducibility, or the color temperature of white, however, is not taken into consideration in this device. Though contrast characteristics are improved, the problem of uneven color occurs in the black display because of the optical phase difference compensator. In the projection-type video display devices described in these patent documents, details relating to producing a long-life liquid crystal panel as a video display element are not considered.

BRIEF SUMMARY OF THE INVENTION

The present invention provides a durable projection-type video display device with excellent display performance. In one aspect, the invention is configured to prevent the yellow component from coming into the liquid crystal panel corresponding to red and green thereby improving color purity of the red and green image light beams by properly setting the properties of the two dichroic mirrors of the light system and the properties of a trimming filter on a deflection plate holder.

In another aspect, the invention is configured such that the color temperature of white produced by mixing three colors is high, and the chromaticity is within 30MPCD in the Y-axis direction from the locus of a black body on the chromaticity coordinates. To achieve this, a reflection-type attenuation filter is placed in the optical path of the green spectrum for reflecting light of 40% or more and the optical energy balance of the three colors is improved.

In another aspect, the invention is configured such that the contrast characteristics of this set can be achieved with reduced cost. To achieve this, an optical phase difference compensator is placed in the optical path of the beam of the green spectrum, which produces excellent relative visibility.

In another aspect, the invention is configured to produce a durable video display element. To achieve this, (1) at least two optical parts which have ultraviolet reflection coating to eliminate ultraviolet radiation are arranged between a light source and a liquid panel corresponding to blue light flux, and an ultraviolet attenuation filter is placed on the incoming side of the blue liquid crystal panel; and (2) any temperature increase of the liquid crystal panel is restrained by placing a reflection-type attenuation filter capable of reflecting light of approximately 40% or more in the optical path of the green spectrum, as previously mentioned.

DETAILED DESCRIPTION OF THE INVENTION

In the following, an example of an embodiment according to the present invention is described referring to the figures. When identical reference numbers are used for components earlier described, the description is not repeated.

Figure 1:
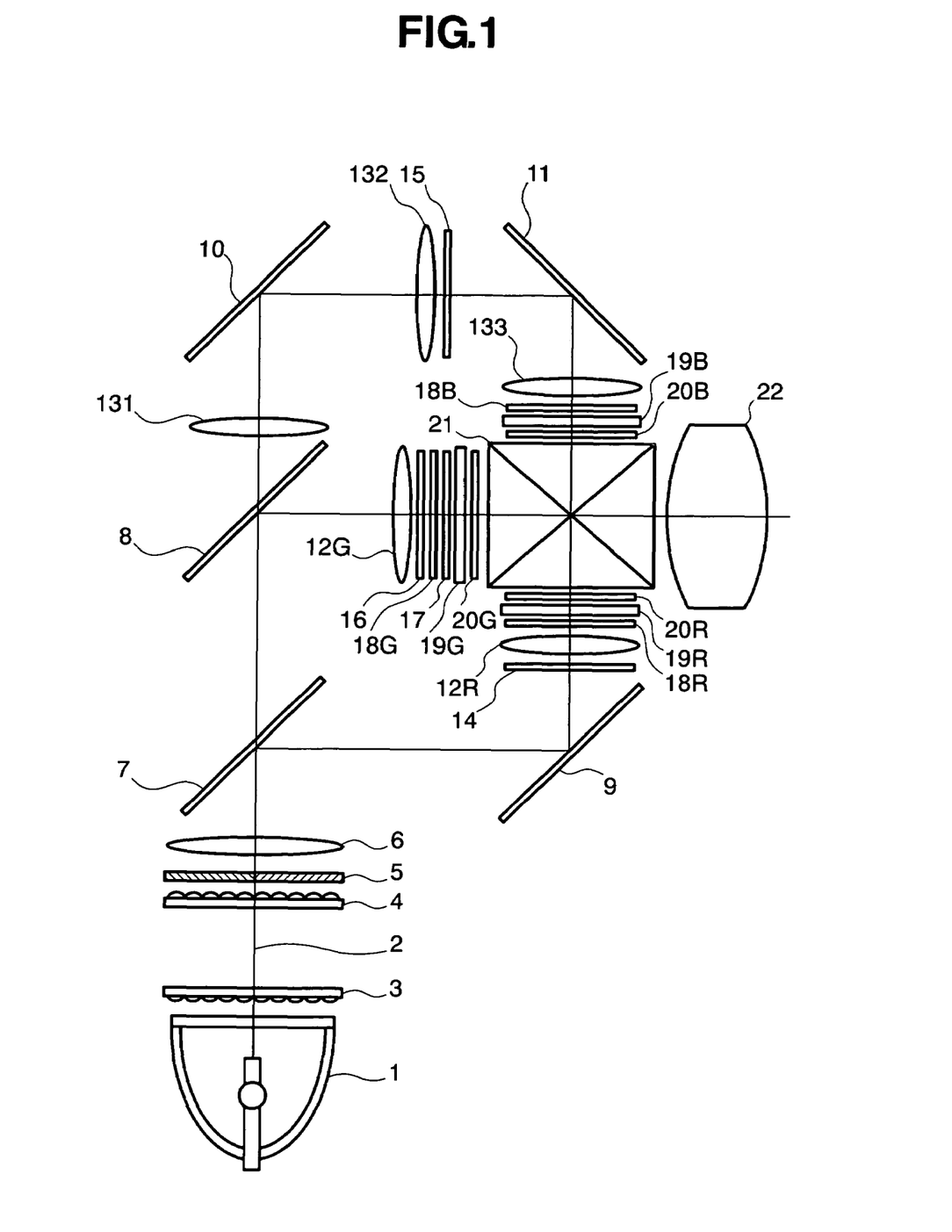
FIG. 1 is a block diagram of an optical unit of a projection-type video display device of the present invention, using a liquid crystal panel as a video display element.

FIG. 1 is a block diagram of an optical unit of a projection-type video display device for a preferred embodiment of the invention, using a liquid crystal panel as a video display element. An optical unit is used for modulating the strength of light from the light source (spatial optical modulation), or for changing the light strength according to video signals from the liquid crystal panel, and expanding and projecting consequently produced images by a projection lens. FIG. 1 shows a white light source 1, an optical axis 2 of the optical unit, a first lens array 3, and a second lens array 4 having integrator functions. Also illustrated are a polarization conversion element 5 for aligning polarization in a predetermined direction and a condenser 6. Dichroic mirror 7 reflects a red light flux and transmits a green-blue light flux, and dichroic mirror 8 reflects a green light flux and transmits a blue light flux. A mirror for red light 9, mirrors for blue light 10, 11, and condenser lens 12 R and 12 G are also shown in the figure. Also depicted are first, second and third relay lenses 131, 132, and 133, an infrared (IR) reflection filter 14, an ultraviolet (UV) absorption filter 15, a reflection-type attenuation filter 16, an optical phase difference compensator 17, incoming side polarizing plates 18R, 18G and 18B, liquid crystal panels 19R, 19G and 19B corresponding to each color; outgoing side polarizing plates 20R, 20G and 20B, a synthesizing prism 21, and a projection lens 22.

Light flux from white light source 1 comes into first lens array 3. First lens array 3 has a plurality of lens cells arranged in a matrix, and it divides the incoming light flux into a plurality of light fluxes and guides them through second lens array 4 and polarization conversion element 5. Second lens array 4 has a plurality of lens cells in a matrix as for first lens array 3. Each lens cell of second lens array 4 corresponds to each lens cell of first lens array 3. Polarization components of light transmitted through first lens array 3 and second lens array 4 are converted by polarization conversion element 5. Light from polarization conversion element 5 is guided into condenser 6, condenser lenses 12R and 12G, first relay lens 131, second relay lens 132, and third relay lens 133, and then it is radiated onto the respective liquid crystal panels 19R, 19G and 19B. At that time, the R-light component of white light from condenser 6 is reflected by red-reflecting green-blue-transmitting dichroic mirror 7, and then the white light reaches liquid crystal panel 19R via mirror 9 for red light. The GB-light component transmitted through the red-reflecting green-blue-transmitting dichroic mirror 7 passes onto the green-reflecting blue-transmitting dichroic mirror 8. The G-light component there is reflected and reaches liquid crystal panel 19G. The B-light component transmitted through the green-reflecting blue-transmitting dichroic mirror 8 passes onto liquid crystal panel 19B via the mirrors 10 and 11 for blue light. The incoming-side polarizing plates 18R, 18G and 18B arranged on incoming sides of the liquid crystal panels 19R, 19G and 19B are formed by attaching a polarization film to a glass substrate as a transparent base material. Glass base plates of the incoming-side polarization plate 18R for red and the incoming-side polarization plate 18G for green are dichroic filters. Accordingly, they also serve as trimming filters, as described below.

Video signal drive electronics (not shown) are connected with the respective liquid crystal panels 19R, 19G and 19B. By controlling voltage applied to transference electrodes corresponding to the respective picture elements of the liquid crystal panels by the video signal drive electronics, polarization torsion is changed. Accordingly, light quantity transmitted through the outgoing-side polarization plate can be controlled per picture element, and an optical image is formed by modulating the light strength to change the gradation of light per picture element.

The resulting optical images on liquid crystal panels 19R, 19G and 19B are color-synthesized by synthesizing prism 21. Then the color-synthesized optical images are projected on a screen (not shown) by projection lens 22, which produces large screen images. First relay lens 131, second relay lens 132 and third relay lens 133 compensate for the long optical path of liquid crystal panel 19B for liquid crystal panels 19R and 19G.

Figure 2:
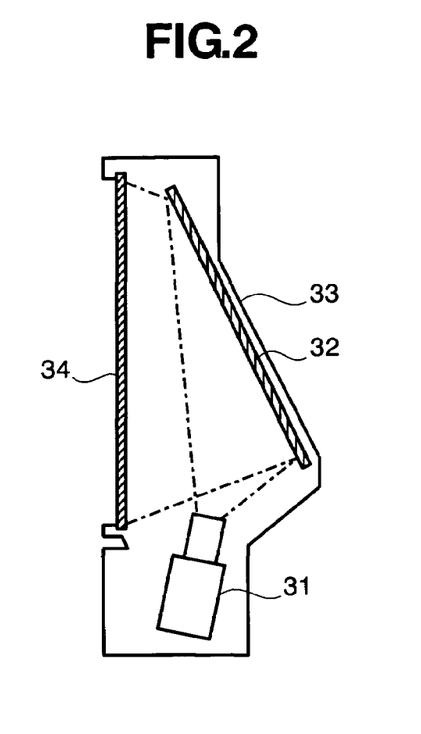
FIG. 2 is a side view of a rear-projection-type video display device.
Figure 3:
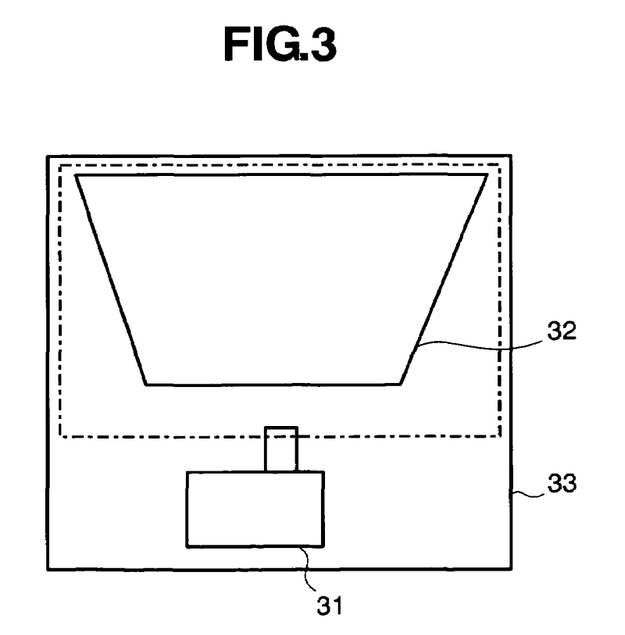
FIG. 3 is a front view of a rear-projection-type video display device.
Figure 4:
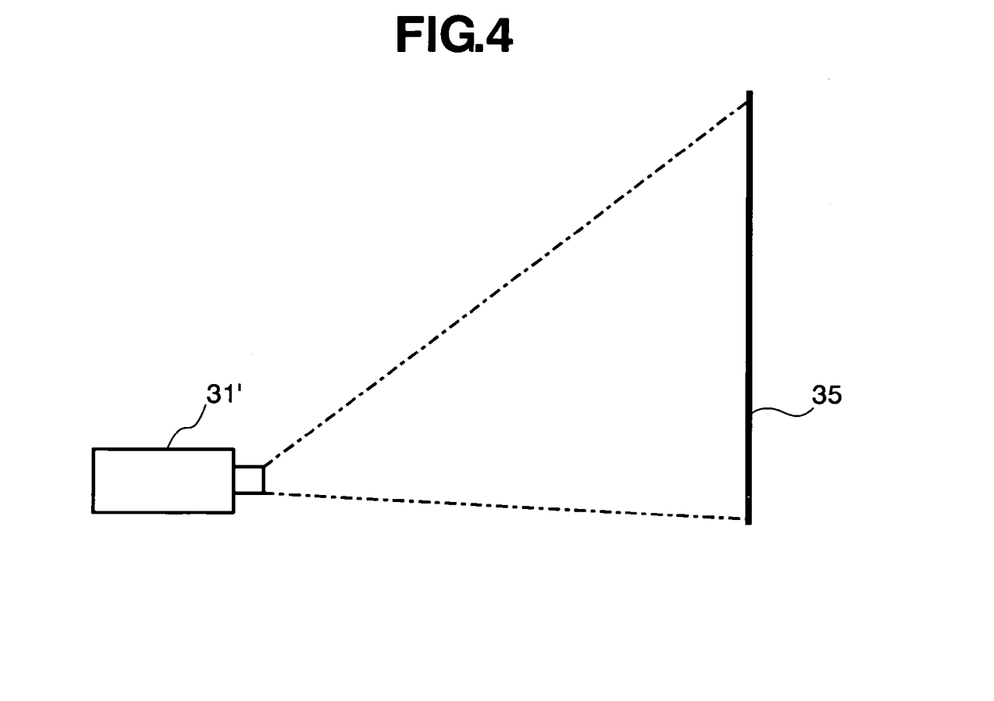
FIG. 4 shows an embodiment adapted to a front-projection-type video display device.

Next, examples of the application of this optical unit to products are described. FIGS. 2 and 3 show embodiments adapted to a rear-projection-type video display device. The rear-projection display device has a cabinet 33, a light-reflecting mirror 32 and a transmission-type screen 34. A projection-type video display device 31 provided with an optical unit and a control circuit (not shown) is arranged inside cabinet 33. Images projected from the projection lens are reflected by the light-reflecting mirror 32 and projected from transmission-type screen 34 on the front surface of cabinet 33. FIG. 4 shows an embodiment adapted to a front-projection-type video display device. The front-projection video device projects images from a projection lens of a projection-type video display device 31', having an optical unit and a control circuit (not shown), onto the front surface of screen 35, which is arranged on a surface separate from but in front of video display device 31.

Figure 5:
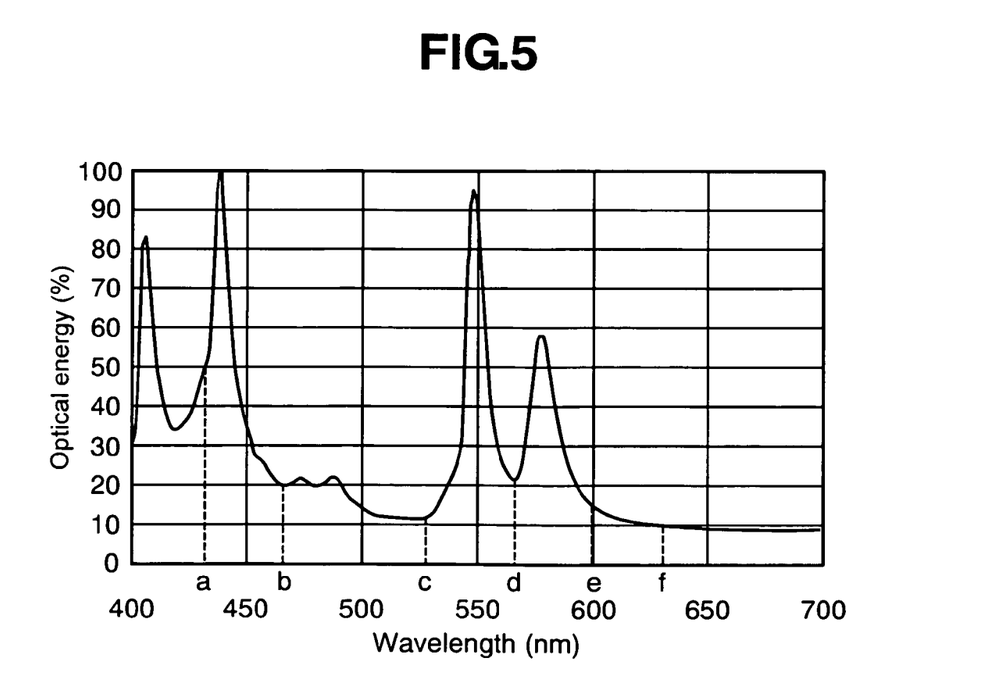
FIG. 5 shows a relative visibility property indicating the spectral energy of an extra-high-pressure mercury lamp as a white light source according to an embodiment of the invention.
Figure 6:
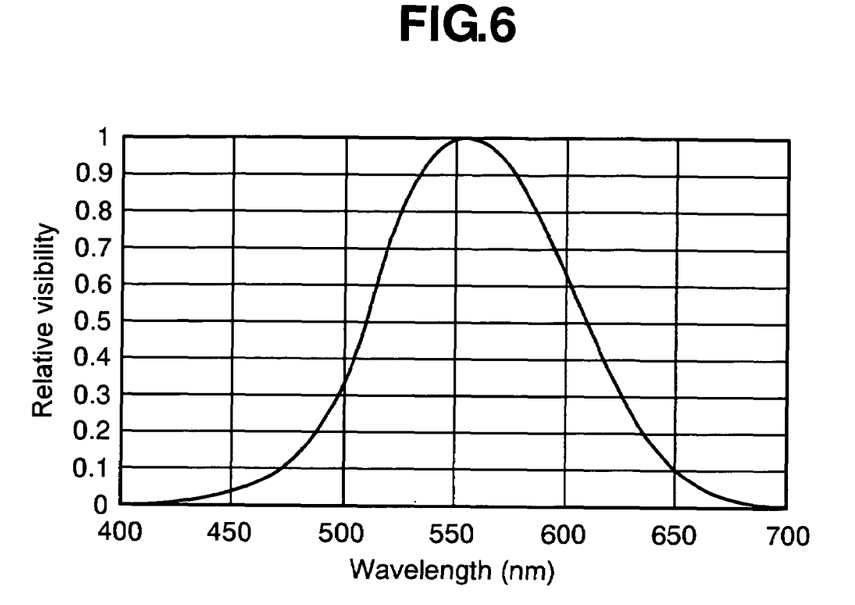
FIG. 6 is a sensitivity characteristic graph.

Front-projection-type video display devices are mainly used for presentations, as shown in FIG. 4, by projecting images from, e.g. a personal computer. In this case, to provide clear images even in a well-lighted room, greater importance is attached to the optical brightness of various kinds of performance items. An optical output of 20001 m or more is achieved by adopting a high-output white light source 1 with an output of 200 W or more and increasing efficiency of the lighting optical systems. In the past, a metal halide pump was used as white light source 1. Recently, an extra-high-pressure mercury lamp having high emission efficiency has been used. Optical energy per wavelength, radiated from white light source 1 is as shown in FIG. 5. Red light energy with a wavelength region from the e-point (600 nm) to the f-point (630 nm) is one third or less of the energy of blue light with a wavelength region from the a-point (435 nm) to the b-point (465 nm) or the energy of green light with a wavelength region from the c-point (535 nm) to the d-point (560 nm). Accordingly, even though the specific sensitivity characteristics shown in FIG. 6 are taken into consideration, optical energy in the red region is relatively reduced.

The brightness property was achieved by fully using light from white light source 1 by mixing light of a yellow-to-cinnabar-red hue with a wavelength region from the d-point (565 nm) to the e-point (600 nm), with green light or red light. As a result, green becomes yellowish green, and red becomes orange, thus reducing the color purity.

Other than the extra-high-pressure mercury lamp, a metal halide lamp, which was previously described, or a xenon lamp also can be used for the white light source. Similarly, since optical components of yellow or orange with a wavelength region of 565-600 nm exist in the spectral energy property of these lamps, technical means, which are described later, are effective for improving color purity when using one of these lamps as the white light source.

In contrast, when one of these lamps is used for a rear-projection-type display device as shown in FIGS. 2 and 3, even though the optical output is 5001 m or less, fully lighted images can be provided by effectively using the screen gain of a transmission-type screen. When a rear-projection display device is used in the general household for television programs, improvement not only in the color purity, the color reproducibility, and the contrast, but also durability of the display device is desired.

Figure 7:
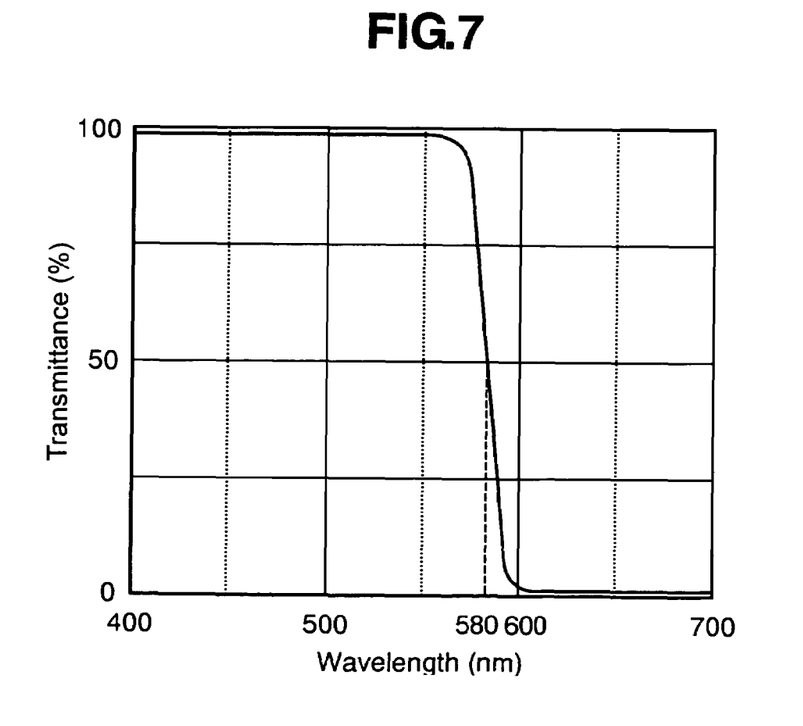
FIG. 7 is a characteristic diagram of a dichroic filter according to an embodiment of the invention.
Figure 8:
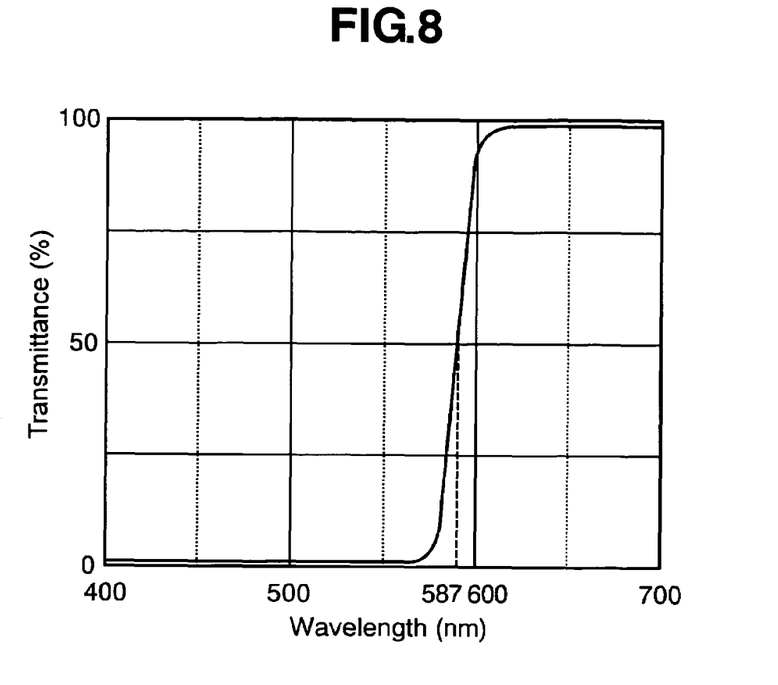
FIG. 8 is a characteristic diagram of a dichroic filter according to an embodiment of the invention.

Next, specific embodiments are described for improving color purity of images, according to the invention. To improve the color purity of red, according to the invention, properties of a dichroic mirror 7 (reflecting red and transmitting green-blue) arranged in the optical path and a trimming filter of a transparent base material to which an incident-side polarizing plate 18R is affixed are optimized as shown in FIGS. 7 and 8. More specifically, FIG. 7 shows a wavelength with transmittance of dichroic mirror 7 being 50% (hereinafter, a half-value wavelength) of approximately 580 nm, showing sharp characteristics. That is, red light flux in the white light flux radiated from white light source 1 is reflected, but the red light flux and the blue light flux (cyan light flux) are transmitted. The red light flux reflected by dichroic mirror 7 contains yellow components of 590 nm or less as shown in FIG. 7. According to the invention, since an extra-high-pressure mercury lamp is used as white light source 1, the optical energy of yellow light having components of 590 nm or shorter largely occupies radiated optical energy as shown in FIG. 5. Accordingly, the yellow component is mixed in the light flux passing onto the red liquid crystal panel producing orangish red. According to the invention, to eliminate the yellow component and improve the color purity of the light flux coming onto the red video display element, the property of a trimming filter made of a transparent base material affixed to the incidence-side polarizing plate 18R is a half-value wavelength of about 587 nm, which is longer than 580 nm, as shown in FIG. 8. Inclination of a property in the half-value wavelength is sharp. Because the two filters vary widely in half-value wavelength in the formation of films, they are well combined as described above. Thereby, the yellow component that originally existed in the emission spectrum of white light source 1 is prevented from coming onto liquid crystal panel 19R as a red video display element.

Figure 9:
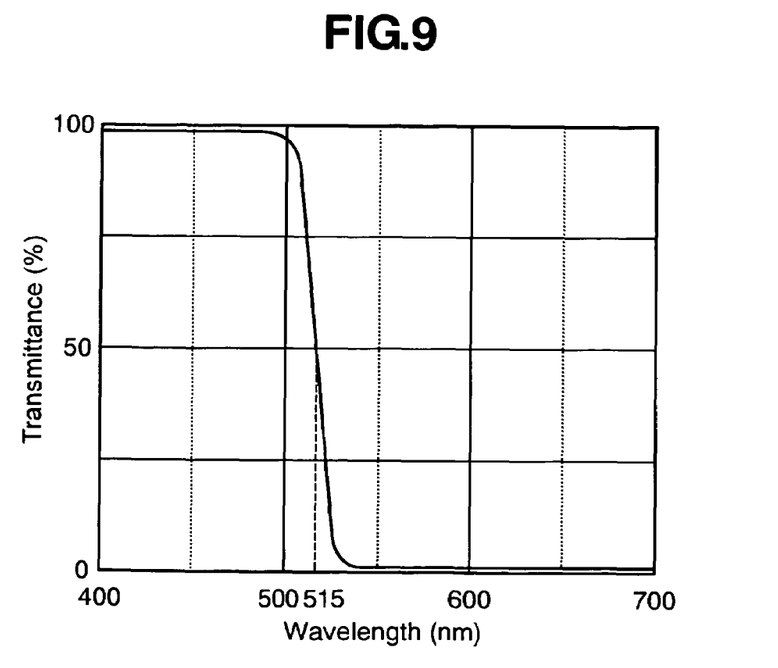
FIG. 9 is a characteristic diagram of a dichroic filter according to an embodiment of the invention.
Figure 10:
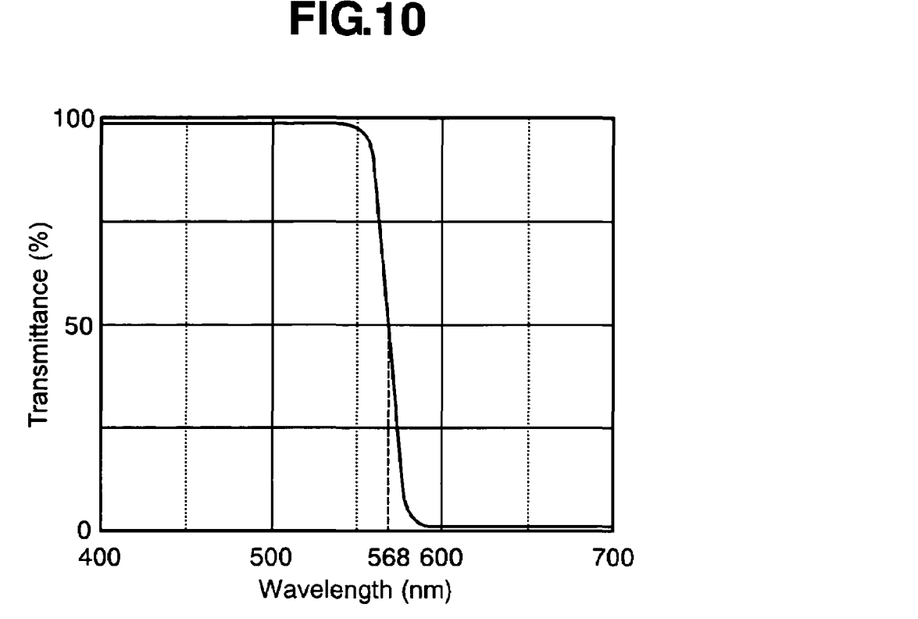
FIG. 10 is a characteristic diagram of a dichroic filter according to an embodiment of the invention.

Similarly, to improve the color purity of the green light flux, according to the invention, properties of a dichroic mirror 8 arranged in the optical path, a dichroic mirror (reflecting green and transmitting blue) and a trimming filter made of a transparent base material to which an incident side polarizing plate 18R is affixed are optimized. Achievable transmittance properties of dichroic mirror 8 and the trimming filter are shown in FIGS. 9 and 10. The green light flux of cyan light flux having transmitted dichroic mirror 7 is reflected by dichroic mirror 8 but the blue light flux is transmitted. The half-value wavelength of dichroic mirror 8 is about 515 nm as shown in FIG. 9. The green light flux reflected by dichroic mirror 8 contains a yellow component of a wavelength of 570 nm or longer.

According to the invention, because an extra-high-pressure mercury lamp is used as white light source 1, the optical energy of yellow light having a component of 570 nm or longer largely occupies radiated optical energy as shown in FIG. 5. Accordingly, the yellow component is mixed in the light flux coming onto the green liquid crystal panel producing yellowish green. According to the invention, the yellow component is eliminated and color purity of the light flux coming onto the green video display element is improved. The property of the trimming filter made of a transparent base material affixed to incidence-side polarizing plate 18G is about 568 nm of a half-value wavelength, which is shorter than 570 nm as shown in FIG. 10. Inclination of a property in the half-value width is sharp. Because the two filters vary widely in half-value wavelength in formation of films, they are well combined as described above. Thereby, the yellow component that originally existed in the emission spectrum of white light source 1 is prevented from coming onto the liquid crystal panel 19G as a green video display element.

An extra-high-pressure mercury lamp as white light source 1 used in the embodiment according to the invention presents a weak emission spectrum of blue-green light component of 500-525 nm as shown in FIG. 5. As a result, the color purity of the light flux transmitted by dichroic mirror 8 is relatively good. Accordingly, there is no need for a trimming filter, thereby reducing costs.

A combination of the above-mentioned dichroic mirror and the trimming filter is modeled below to observe chromaticity by simulation, the chromaticity being given below:

Red: x=0.648, y=0.343
Green: x=0.301, y=0.685
Blue: x=0.141, y=0.067

Figure 11:
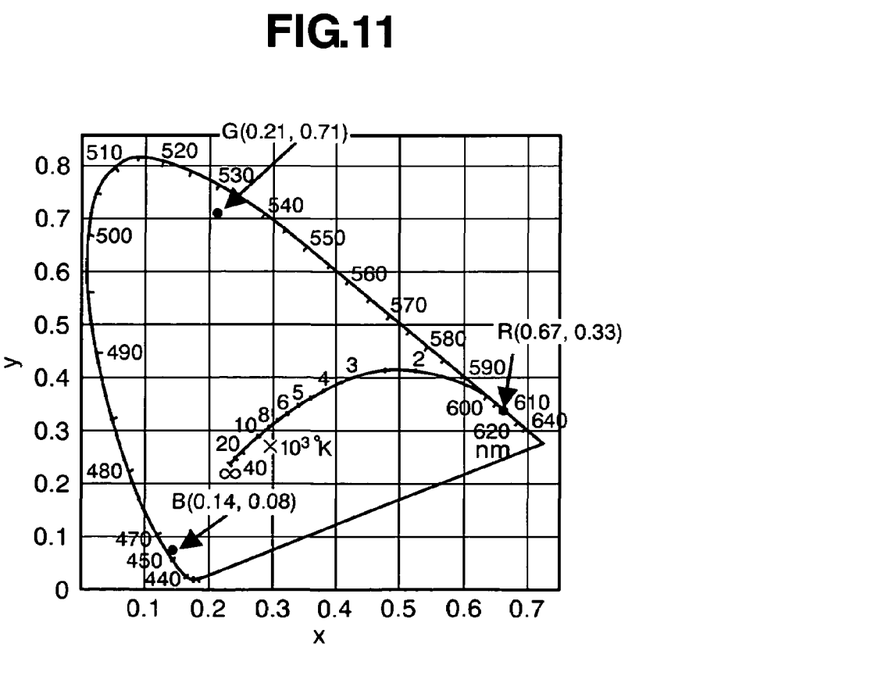
FIG. 11 shows NTSC color reproduction ranges provided on the xy-chromaticity diagram of the CIE (International Commission on Illumination) 1931.

These values are approximately identical to those of red R (0.67, 0.33), green G (0.21, 0.71) and blue B (0.14, 0.08) of the NTSC color reproduction ranges (respectively indicated by triangle signs) on the xy-chromaticity diagram of CIE (International Commission on Illumination) 1931 shown in FIG. 11, and are within a color reproduction range causing no problems in use for a television.

Figure 12:
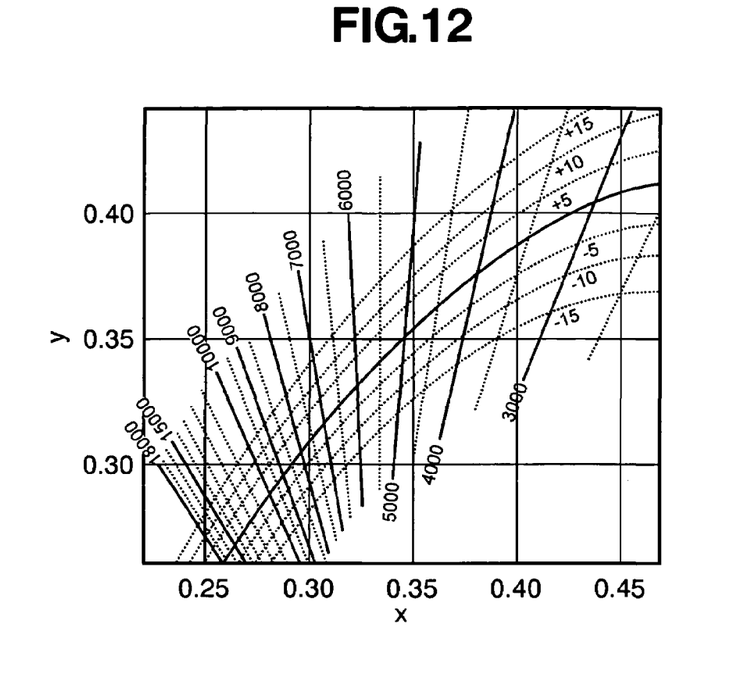
FIG. 12 is a diagram of a locus of a black body.

Next, the white video display is described. Reproduced colors expressed by light are shown by additive color mixing of the three primary colors R, G, B. That is, they are expressed by a balance of the light flux quantity transmitted to the liquid crystal panels 19R, 19G, 19B of the respective colors. For example, when the light flux quantity of the respective colors is controlled in 256 steps of gradation of 0-255, R=G=B=0 is a black display, and R=G=B=255 is a white display. The conventional front-projection-type video display device shown in FIG. 4 was designed primarily taking brightness into consideration. Consequently, the optical energy of green having high relative visibility was increased to make the greenish white display brighter. As a result, white became a color apart in the plus side (more greenish direction) from the locus of a black body (shown by a full solid line in FIG. 12) in the isochromatic temperature line. In the color design of the first prior art reference discussed above, when the white display R=G=B=255 was implemented, White: x=0.268, y=0.353, and the color temperature was 8600° K, being a color apart from a locus of a black body by approximately +40 MPCD (Minimum Perceptible Color Difference).

In contrast, when used for a rear-projection-type video display device as shown in FIGS. 2 and 3, the design must be as close as possible to a locus of a black body similar to a direct vision television or a three-tube-type rear-projection television and must be a bluish white color temperature of 10000° K or higher.

The white display used for television, however, cannot be achieved by combining the above-mentioned filters. Taking dispersion in mass production of filter properties into consideration, to provide the chromaticity of the white image determined as a set, the following considerations are important for an optical unit of a projection-type video display device: (1)

Dispersion of V-T characteristics of a liquid crystal panel for wavelength (color) and (2) Arranging a reflection-type attenuation filter 16 in an optical path of green to optimize the green light flux passing onto a green liquid crystal panel 19G.

Item (1) is a characteristic specific to a liquid crystal panel, and transmittance increases as a wavelength of incoming light flux gets shorter when an identical drive voltage is applied to a transparent electrode. For example, suppose that transmittance of blue light flux when a regulated voltage is applied is 90%, green light flux 88.5% and red light flux 82.5%. For item (2), since the optical energy of the green light is too large, the Y-value in the white display is also high. By arranging a reflection-type attenuation filter 16 in an optical path of green, the green light flux reaching green liquid crystal panel 19G is optimized.

Next, the inventors implemented simulation with setting a cut quantity of the green light flux 35%.
Chromaticity of white
White: x=0.263, y=0.295, and the color temperature is approximately 11600° K, being a coordinate point of +14 MPCD. They found a brightness of 3551 m can be achieved with the light flux quantity acquired at that time even when a low-power high-pressure mercury lamp of 100 W is used. Accordingly, this optical device can be satisfactorily used as a rear-projection-type video display device.

Next, assume that the reduced quantity is approximately 52%; chromaticity of white is:
White: x=0.260, y=0.270, and the color temperature is approximately 16000° K, being apart from a locus of a black body by only about 4 MPCD. Accordingly, by arranging a reflection-type attenuation filter in an optical path of green, the color temperature is increased bringing white close to a locus of a black body, and thereby becomes preferable for displaying television images. Brightness of 3021 m can be achieved with the light flux quantity acquired at that time even when a low-power high-pressure mercury lamp of 100 W is used as white light source 1. Accordingly, this optical device can be satisfactorily used as a rear-projection-type video display device.

Next, contrast characteristics are described. As shown above, when the light flux quantity of the respective colors is controlled in 256 steps of gradation of 0-255, R=G=B=0 is a black display, and R=G=B=255 is a white display. Contrast is expressed by a ratio of the brightness of R=G=B=255 white display) to that of R=G=B=0 (black display). In a conventional projection-type display device described in Patent document 2, brightness is primarily considered, and an extra-high-pressure mercury lamp of 200 W or higher is used as white light source 1, resulting in the white display brightness having a light flux quantity of 2000 l m or more. Concurrently in Patent document 2, an optical phase difference compensator is arranged in every optical path of RGB to improve contrast characteristics. An optical phase difference compensator provides an opposite phase for a residual phase difference produced by birefringence of the liquid crystal layer in the black display and compensates for it in a liquid crystal panel. Suppose brightness (the light flux quantity) in a white display is 2000 l m and the contrast characteristic is 500:1; the brightness in a black display is 4 l m. In a black display having a light flux quantity of 4 l m, the optical phase difference compensator produces uneven color.

On the other hand, for a rear-projection-type video display device, brightness (the light flux quantity) in the white display is approximately 300 l m, approximately one seventh of the total light flux quantity. As a result, even when the contrast is similarly 500:1, brightness in the black display is 0.6 l m, which is very dark. At this point, most of the light flux quantity in the black display is the optical energy of green, and a little is the optical energy of red or blue. Taking this fact into consideration in the invention, an optical phase difference compensator 17 is used only in an optical path of green. Accordingly, high contrast can be provided with a minimum increase in cost.

Further, since only one optical phase difference compensator 17 is used in an optical path of green, the light flux quantity in the black display can be at the minimum, causing little distinguishable uneven color. In comparison to a conventional front-projection-type video display device, in a rear-projection-type video display device according to the invention, the absolute value of optical energy is low. Furthermore, according to the invention, since an optical phase difference compensator 17 is arranged on an outgoing side of a reflection-type attenuation filter 16, optical energy reaching optical phase difference compensator 17 as organic matter can be reduced as much as approximately 50%. Accordingly, a temperature increase of optical phase difference compensator 17 can be prevented, and high reliability can be provided by inhibiting performance deterioration.

In the embodiment according to the invention, optical phase difference compensator 17 is arranged between incidence-side polarizing plates 18 and liquid crystal panel 19G, however, it should not be limited only to this embodiment. For example, it is also possible that optical phase difference compensator 17 be arranged between liquid crystal panel 19G and outgoing-side polarizing panel 20G.

Next, the durability of liquid crystal panels 19R, 19G and 19B is described. Factors causing deterioration of a liquid crystal panel are temperature and the amount of optical energy consumed. Especially in terms of optical energy, the panel is weaker when ultraviolet light with a short wavelength is an energy source.

A liquid crystal panel deteriorates more quickly as the use temperature increases. The temperature of a liquid crystal panel is increased by the optical energy radiated onto the panel because one of the panel's constituents is a light-absorbing material.

In a projection-type video display device according to an embodiment of the invention, optical energy passing onto liquid crystal panel 19G, for green having the highest optical energy, is, as shown above, reduced as much as approximately 50% by the reflection-type attenuation filter 17. Accordingly, the temperature increase of the liquid crystal panel 19G for green is small, and the quantity of gas blown in by a cooling fan (not shown) for cooling liquid crystal panels can be kept small. Fan noise can also be controlled.

A structure, adopted into the invention for reducing ultraviolet reaching a liquid crystal panel is now described. Ultraviolet light transmits to dichroic mirror 7 having the characteristics shown in FIG. 7 and to dichroic mirror 8 having the characteristics shown in FIG. 9. Accordingly, ultraviolet light does not pass onto an optical path of R-color light or that of G-color light, these optical paths being reflection optical paths of the dichroic mirrors. Of all the liquid crystal panels 19R, 19G and 19B, ultraviolet light can pass only onto liquid crystal panel 19B in an optical path of B-color light.

When ultraviolet light reaches liquid crystal panel 19B, a light distribution film and a liquid crystal sealing material, which are organic material constituents of panel 19B, decompose and mix into the liquid crystal. As a result, the dielectric constant changes and the applied voltage and transmittance (V-T characteristics) of the panel change to their initial state. Since the liquid crystal itself changes in quality and the V-T characteristics change, even when identical voltage is applied, the display of images changes, causing deterioration of image quality. Further decomposition causes the liquid crystal to become increasingly gaseous, and the liquid crystal cannot be controlled by the applied voltage.

Figure 13:
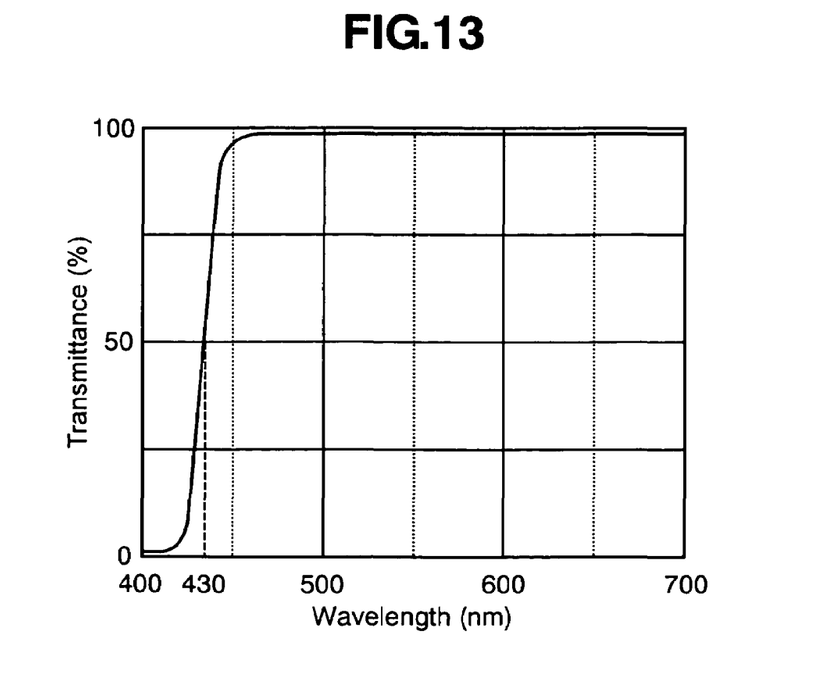
FIG. 13 is a characteristic diagram of a UV filter according to an embodiment of the invention.

In a conventional projection-type video display device, since brightness is primarily taken into consideration and as much as blue light flux is made to pass onto a liquid crystal panel, UV filters with a half-value wavelength of 420-425 nm have commonly been used. In contrast, according to the invention, to achieve a long life for the device, a UV filter with the characteristic of a half-value wavelength of approximately 430 nm (between 426-434 nm) as shown in FIG. 13 is used for preventing ultraviolet and blue light having high optical energy from reaching liquid crystal panel 19B. For a reflection-type filter, as shown in FIG. 13, a very small amount of light beams of a wavelength of ~400 nm transmits UV by approximately 0.5%. To prevent this, a reflection-type UV-cut coating of a half-value wavelength of approximately 430 nm (426-433 nm) is applied on two places of a first lens array 3 and a second lens array 4. Additionally, by placing an absorption-type UV-cut filter 15 just in front of liquid crystal panel 19B in an optical path of B-color light where ultraviolet light might pass, the ultraviolet light reaching liquid crystal panel 19B is $1.25 \times 10^{-5}\%$ or less, achieving high reliability (long life).

The preceding effects can be achieved even by a rear-projection-type video display device having the above-mentioned projection-type video display device arranged as shown in FIGS. 2 and 3 and expanding and projecting on a screen via an optical path reflective mirror. In the above-mentioned projection-type video display device and a rear-projection-type video display device using the same, optimizing characteristics of two dichroic mirrors and that of a trimming filter provided to a polarizing plate produces image light of R, G and B with good color purity.

The color temperature of white light is increased by placing a 50% reflection-type attenuation filter in the G optical path. In addition, increases in costs are kept to the minimum and the contrast characteristics of the set are improved by placing an optical phase difference compensator in an optical path of G light with the highest relative visibility. Not only is an absorption-type UV-cut filter placed just in front of a liquid crystal panel for B light, but a reflective UV-cut coating is also applied on the plane sides of a first lens array 3 and a second lens array 4. As a result, long life of the liquid crystal panel is achieved. As described above, according to the invention, a projection-type display device with high image quality can be obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A projection type display device comprising:
   a white light source and a spectral unit for making spectral diffraction of a visible light flux radiated from the white light source into three primary colors of red, green and blue;
   a red display element, a green display element, and a blue display element configured to modulate light strength of the spectrally diffracted light flux per picture element according to an input image signal;
   a light synthesizing unit for synthesizing the modulated light fluxes of respective colors from the red, green and blue display elements;
   a projection lens for expanding and projecting the light synthesized by the light synthesizing unit on a screen;
   a first reflector, arranged between at least either of the red display element or the green display element and the white light source, for selectively reflecting a light flux component of a predetermined wavelength region by combining with the spectral unit;
   a second reflector, arranged between the green display element and the white light source, for reflecting a predetermined amount of green light component, wherein the second reflector has a reflectance of 35% or more near a wavelength of 545 nm; and
   a single optical phase difference compensator, the single optical phase difference compensator disposed between the green display element and the second reflector.

2. The projection type display device according to claim 1, wherein the predetermined wavelength region includes a yellow light region of wavelength of 565-600 nm.

3. The projection type display device according to claim 1, wherein the white light source provides less optical energy of a red light region than of green and blue light regions.

4. The projection type display device according to claim 1, wherein the white light source is any one of an extra-high pressure mercury lamp, a xenon lamp or a metal halide lamp.

5. The projection type display device according to claim 1, wherein a plurality of reflection type UV-cut filters with half-value wavelength of approximately 430 nm are provided to a plurality of places of an optical part arranged between the white light source and the spectral unit, and an absorption type UV-cut filter with half-value wavelength of approximately 430 nm is provided between the blue display element and the spectral unit.

6. The projection type display device according to claim 1, wherein the second reflector further has a reflectance of less than 35% at other wavelengths.

7. A back projection type display device comprising:
   a white light source;
   a spectral unit for making spectral diffraction of a visible light flux radiated from the white light source into three primary colors of red, green and blue;
   a red display element, a green display element and a blue display element configured to modulate light strength of the spectrally diffracted light flux per picture element according to an input image signal;
   a light synthesizing unit for synthesizing the modulated light fluxes of respective colors from the red, green and blue display elements;
   a screen;
   an optical path turning-back mirror;
   a projection lens for expanding and projecting the light synthesized by the light synthesizing unit on a screen via the optical path turning-back mirror;
   a first reflecting means which is arranged between at least any one of the red display element and the green display element and the white light source, for selectively reflecting a light flux component of a predetermined wavelength region by combining with the spectral unit;
   a second reflector which is arranged between the green display element and the white light source, for reflecting a predetermined amount of green light component, wherein the second reflector has a reflectance of 35% or more near a wavelength of 545 nm; and a single optical phase difference compensator, the single optical phase difference compensator disposed between the green display element and the second reflector.

8. The back projection type display device according to claim 7, wherein the predetermined wavelength region includes a yellow light region of wavelength of 565-600 nm.

9. The back projection type display device according to claim 7, wherein the white light source provides less optical energy of a red light region than of green and blue light regions.

10. The back projection type display device according to claim 7, wherein the white light source is any one of an extra-high pressure mercury lamp, a xenon lamp or a metal halide lamp.

11. The back projection type display device according to claim 7, wherein a plurality of reflection type UV-cut filters with half-value wavelength of approximately 430 nm are provided to a plurality of places of an optical part arranged between the white light source and the spectral unit, and an absorption type UV-cut filter with half-value wavelength of approximately 430 nm is provided between the blue display element and the spectral unit.

12. The back projection type display device according to claim 7, wherein the second reflector further has a reflectance of less than 35% at other wavelengths.

* * * * *